April 7, 1925. 1,532,218

F. E. ANDREANI

VEHICLE BUMPER

Filed Nov. 9, 1922

INVENTOR:
FINDLEY E. ANDREANI,
BY
Graham & Harris
ATTORNEYS.

Patented Apr. 7, 1925.

1,532,218

UNITED STATES PATENT OFFICE.

FINDLEY E. ANDREANI, OF LOS ANGELES, CALIFORNIA, ASSIGNOR TO UNITED STATES BUMPER CO., A CORPORATION OF CALIFORNIA.

VEHICLE BUMPER.

Application filed November 9, 1922. Serial No. 599,773.

*To all whom it may concern:*

Be it known that I, FINDLEY E. ANDREANI, a citizen of the United States, residing at Los Angeles, in the county of Los Angeles, State of California, have invented a new and useful Vehicle Bumper, of which the following is a specification.

My invention relates to vehicle bumpers such as are employed upon automobiles, and has for its principal object to provide a bumper, for use upon the front and rear of an automobile, which may be made of lighter weight material than is now employed for such purposes and will yet be of stronger construction.

It is a further object of the invention to provide a bumper in which the center and ends of the bumper are braced against deflection, and which is of such construction as to be non-vibrating.

The especial advantages and further objects will be made evident hereinafter.

Referring to the drawings, which are for illustrative purposes only,

Figure 1:
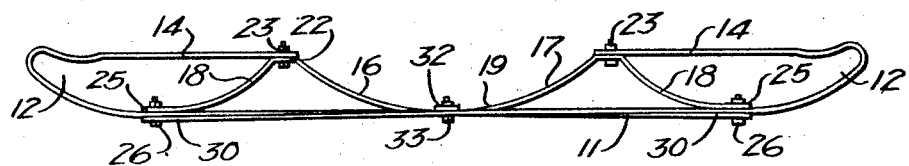
Fig. 1 is a plan view of my improved type of bumper.
Figure 2:
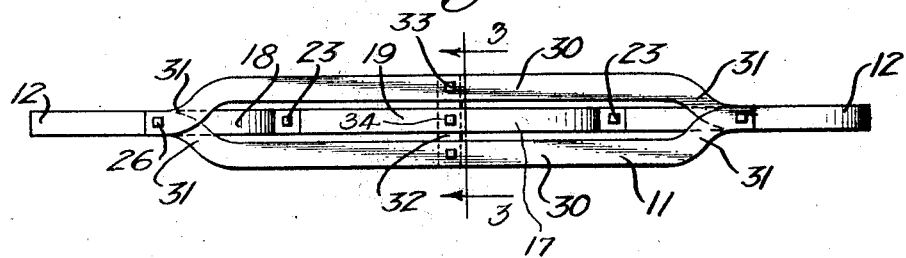
Fig. 2 is a front elevation thereof.
Figure 3:
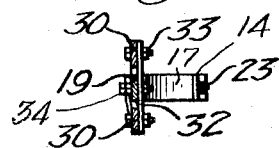
Fig 3 is a section taken substantially upon the plane represented by the line 3—3 of Fig. 2.

The inventor is aware that vehicle bumpers have been formed of a bar of metal having the ends inwardly bent. Such bumpers are inefficient and do not function in the manner to provide maximum protection of the extremities of the automobile upon which they are placed owing to the extreme resiliency thereof and the lack of strength across the central portion; such bumpers may be considered ornamental rather than useful, unless constructed of heavy material. The form in which these bumpers are constructed leaves a very broad central extension of unsupported spring metal which vibrates readily and produces a humming sound.

My invention provides a bumper which gives a maximum protection, due to its sturdy construction, and which may be made of lighter material owing to the disposition of the parts thereof to give a maximum strength to its structure. The combination of the certain arches with the frontal structure and the bows provides a truss formation.

In the preferred embodiment of my invention there is provided a frontal structure, indicated generally by the reference numeral 11, and comprising a pair of parallel flat steel bars 30 disposed in spaced relation with their medial portions connected by a vertical tie bar 32 and bolts 33, thus providing a frontal structure of considerable depth, which is particularly desirable in a bumper of this type, both from a standpoint of utility and appearance. As indicated at 31, the respective bars 30 are bent towards each other at opposite ends of the frontal structure and are secured together in overlapping relation by bolts 26.

Beyond the ends of the frontal structure I provide bows 12, each of which are formed by extending an end of each respective bar 30, each respective bow being bent inwardly to provide a leg 14 spaced rearwardly from and parallel to the frontal structure 11, and to constitute members which may be employed for attachment to a vehicle.

For the purpose of bracing the center and ends of the bumper against undue deflection and vibration certain arch members are combined with the frontal structure and the bows to form a truss structure and to provide a sturdy construction, the individual elements of which may be formed of relatively light material. This truss, or arch structure 16, includes a central arch 17 and opposite cantilever arches 18, the crown 19 of the central arch 17 being secured to the tie bar 32 between the bars 30 of the frontal structure by a bolt 34, and the ends 22 thereof being secured to the respective legs 14 of the bows 12. The central arch 17 and the cantilever arches 18 are formed from one continuous strip of flat steel, and the ends 25 of the arches 18 are secured to the respective ends of the frontal structure by the bolts 26.

The above described construction provides a sturdy bumper which is free from undue flexation and vibration and which can be easily manufactured at a relatively low cost, and while the specific embodiment herein disclosed is well adapted to fulfill the objects primarily stated, it is to be understood that the invention is not to be limited in this regard, for it is susceptible of embodiment in various other forms, all coming within the scope of the following claim.

I claim as my invention:

In a vehicle bumper, the combination of: a laterally extending frontal structure having a single bow at each end thereof, said structure being formed of a bar offset upwardly near one end thereof and having the other end bent rearwardly to form one of said bows and a second bar offset downwardly near one end thereof and having its other end bent rearwardly to form the other of said bows, said offset portions of said bars being spaced apart and of parallel horizontal extension; an arch member consisting of a central arch, the crown of which extends between said offset portions of said bars and the ends of which central arch are joined to the inwardly turned ends of said bows, said arch member further consisting of cantilever portions extending from the ends of said central arch and secured to said frontal structure; and a vertically disposed bar extending across the crown of said central arch and said offset portions of said bars and being rigidly secured thereto.

In testimony whereof, I have hereunto set my hand at Los Angeles, California, this 31st day of October, 1922.

FINDLEY E. ANDREANI.